(12) United States Patent
Nishijima (10) Patent No.: US 11,453,241 B2
(45) Date of Patent: Sep. 27, 2022

(54) PNEUMATIC TIRE

(71) Applicant: Sumitomo Rubber Industries, Ltd., Hyogo (JP)

(72) Inventor: Shigeki Nishijima, Kobe (JP)

(73) Assignee: SUMITOMO RUBBER INDUSTRIES, LTD., Hyogo (JP)

(*) Notice: Subject to any disclaimer, the term of this patent is extended or adjusted under 35 U.S.C. 154(b) by 39 days.

(21) Appl. No.: 17/018,252

(22) Filed: Sep. 11, 2020

(65) Prior Publication Data

US 2021/0094351 A1 Apr. 1, 2021

(30) Foreign Application Priority Data

Sep. 26, 2019 (JP) .............................. JP2019-176012

(51) Int. Cl.
  *B60C 3/04* (2006.01)
  *B60C 9/08* (2006.01)
  *B60C 15/00* (2006.01)
  *B60C 15/06* (2006.01)
  *B60C 9/02* (2006.01)

(52) U.S. Cl.
  CPC ............... *B60C 3/04* (2013.01); *B60C 15/06* (2013.01); *B60C 15/0603* (2013.01);
  (Continued)

(58) Field of Classification Search
  CPC ............ B60C 15/0603; B60C 15/0607; B60C 2015/061; B60C 2015/0617;
  (Continued)

(56) References Cited

U.S. PATENT DOCUMENTS

| 5,772,811 A * | 6/1998 | Ueyoko ..................... B60C 3/04 |
|---|---|---|
|  |  | 152/454 |
| 2016/0193874 A1 | 7/2016 | Asano et al. |

(Continued)

FOREIGN PATENT DOCUMENTS

| FR | 2940189 A1 * | 6/2010 | ............... B60C 1/00 |
|---|---|---|---|
| JP | 2002160510 A * | 6/2002 | ......... B60C 15/0054 |

(Continued)

OTHER PUBLICATIONS

Machine Translation: JP-2017218065-A; Kibayashi Y; (Year: 2022).*

(Continued)

*Primary Examiner* — Kendra Ly (74) *Attorney, Agent, or Firm* — Greenblum & Bernstein, P.L.C.

(57) ABSTRACT

A pneumatic tire comprises a carcass ply extending between bead portions through a tread portion and sidewall portions, and turned up around a bead core from the inside to the outside of the tire in each of the bead portions, so as to form a pair of turnup portions and a main portion therebetween. In each the bead portion, a first apex rubber and a second apex rubber are disposed. The first apex rubber is disposed between the turnup portion and the main portion. The second apex rubber is disposed axially outside the turnup portion. A complex elastic modulus b of the second apex rubber is larger than that of the first apex rubber. The cross-sectional width Wt in mm of the tire and the outer diameter Dt in mm of the tire satisfy the following conditions $Dt=<59.078 \times Wt^{0.498}$ and $Dt>=59.078 \times Wt^{0.460}$.

18 Claims, 6 Drawing Sheets

(52) U.S. Cl.
CPC .. *B60C 15/0607* (2013.01); *B60C 2009/0276* (2013.01); *B60C 2009/0284* (2013.01); *B60C 2015/061* (2013.01); *B60C 2015/0614* (2013.01); *B60C 2015/0621* (2013.01)

(58) Field of Classification Search
CPC ........ B60C 2015/0621; B60C 15/0009; B60C 15/0027; B60C 15/0054; B60C 2015/009; B60C 2015/0625
See application file for complete search history.

(56) References Cited

U.S. PATENT DOCUMENTS

| | | | |
|---|---|---|---|
| 2017/0036490 A1* | 2/2017 | Munezawa | B60C 15/0603 |
| 2017/0072750 A1* | 3/2017 | Munezawa | B60C 15/0603 |
| 2017/0274710 A1* | 9/2017 | Matsumoto | B60C 9/2204 |

FOREIGN PATENT DOCUMENTS

| | | | |
|---|---|---|---|
| JP | 2007045333 A | * | 2/2007 |
| JP | 2015-33984 A | | 2/2015 |
| JP | 2017218065 A | * | 12/2017 |

OTHER PUBLICATIONS

Machine Translation: JP-2002160510-A; Kuniyasu T; (Year: 2022).*
Machine Translation: FR-2940189-A1; Daval B; (Year: 2022).*
Machine Translation: JP-2007045333-A; Kurematsu N; (Year: 2022).*

\* cited by examiner

PNEUMATIC TIRE

TECHNICAL FIELD

The present invention relates to a pneumatic tire.

BACKGROUND ART

In recent years, pneumatic tires are required to contribute to improvement of fuel efficiency.

Patent Document 1 below discloses a pneumatic tire which has a narrow width and a large outer diameter in order to reduce the rolling resistance and air resistance. Hereinafter, such a pneumatic tire is referred as "narrow-with large-diameter pneumatic tire".

Patent Document 1: Japanese Patent Application Publication No. 2015-33984

SUMMARY OF THE INVENTION

Problems to be Solved by the Invention

A narrow-with large-diameter pneumatic tire is usually inflated to a relatively high pressure, therefore, the vertical spring constant of the tire is increased.
This tends to degrade the ride comfort performance and noise (road noise) performance of the tire. Thus, the narrow-with large-diameter pneumatic tire has room for improvement in this regard.

In order to avoid such increase in the vertical spring constant, it is conceivable to reduce the size of a bead apex rubber which is disposed in the bead portion to reinforce the bead portion. Such a technique is however, liable to decrease the in-plane torsional rigidity of the bead portion, which leads to deterioration in the steering stability performance of the tire.

In view of the above-described problems, the present invention was made, and a primary objective of the present invention is to provide a narrow-with large-diameter pneumatic tire in which the ride comfort performance, noise performance, and steering stability performance can be improved in a well-balanced manner.

According to the present invention, a pneumatic tire comprises:
a tread portion,
a pair of sidewall portions,
a pair of bead portions each with a bead core embedded therein,
a carcass ply extending between the bead portions through the tread portion and the sidewall portions, and turned up around the bead core in each of the bead portions from the inside to the outside of the tire so as to form a pair of turnup portions and a main portion therebetween, and
a first apex rubber and a second apex rubber disposed in each of the bead portions,
wherein
the first apex rubber is disposed between the above-said turnup portion and main portion,
the second apex rubber is disposed axially outside the turnup portion, and
a complex elastic modulus $E^*b$ of the second apex rubber is larger than a complex elastic modulus $E^*a$ of the first apex rubber,
wherein
a cross-sectional width Wt in mm of the tire and an outer diameter Dt in mm of the tire satisfy the following conditions (1) and (2), $$Dt =< 59.078 \times Wt^{0.498} \tag{1}$$

$$Dt >= 59.078 \times Wt^{0.460}. \tag{2}$$

It is preferable that the difference ($E^*b - E^*a$) between the complex elastic modulus $E^*b$ of the second apex rubber and the complex elastic modulus $E^*a$ of the first apex rubber is in a range from 15 to 35 MPa.

It is preferable that the complex elastic modulus $E^*b$ of the second apex rubber is in a range from 60 to 70 MPa.

It is preferable that the second apex rubber has a radially outer edge located radially inside the maximum tire section width position.

It is preferable that the bead portions are each provided with a clinch rubber located axially outside the second apex rubber, and
the clinch rubber has a radially outer edge located radially inside the radially outer edge of the second apex rubber.

It is preferable that the second apex rubber has a maximum thickness at a radial position within a range extending in the tire radial direction by a radial distance of 10% of a radial dimension of the first apex rubber, toward the radially outside and toward the radially inside from the radially outer edge of the first apex rubber.

It is preferable that the radially inner edge of the second apex rubber is located within a range extending in the tire radial direction by a radial distance of 3 mm toward the radially outside and toward the radially inside from the outer surface of the bead core.

It is preferable that a radial dimension of the second apex rubber is larger than a radial dimension of the first apex rubber.

It is preferable that the radial dimension of the second apex rubber is in a range from 2.5 to 4.0 times the radial dimension of the first apex rubber.

The present invention is based on a narrow-with large-diameter pneumatic tire whose cross-sectional width Wt in mm and outer diameter Dt in mm satisfy conditions:

$$Dt =< 59.078 \times Wt^{0.498} \tag{1}$$

and $$Dt >= 59.078 \times Wt^{0.460}. \tag{2}$$

According to the present invention, the second apex rubber having the complex elastic modulus higher than that of the first apex rubber can increase the in-plane torsional rigidity of the bead portion, and improve the steering stability.
At the same time, the first apex rubber can moderate the radial stiffness of the bead portion, and improves the ride comfort performance and noise performance.
Therefore, the narrow-with large-diameter pneumatic tire according to the present invention is improved in the ride comfort performance, noise performance, and steering stability performance in a well-balanced manner.

DESCRIPTION OF THE PREFERRED EMBODIMENTS

The present invention can be applied to pneumatic tires for heavy duty vehicles such as trucks and buses, but suitably applied to pneumatic tires for passenger cars.

Taking a pneumatic tires for passenger cars as example, an embodiments of the present invention will now be described in detail in conjunction with accompanying drawings.

Figure 1:
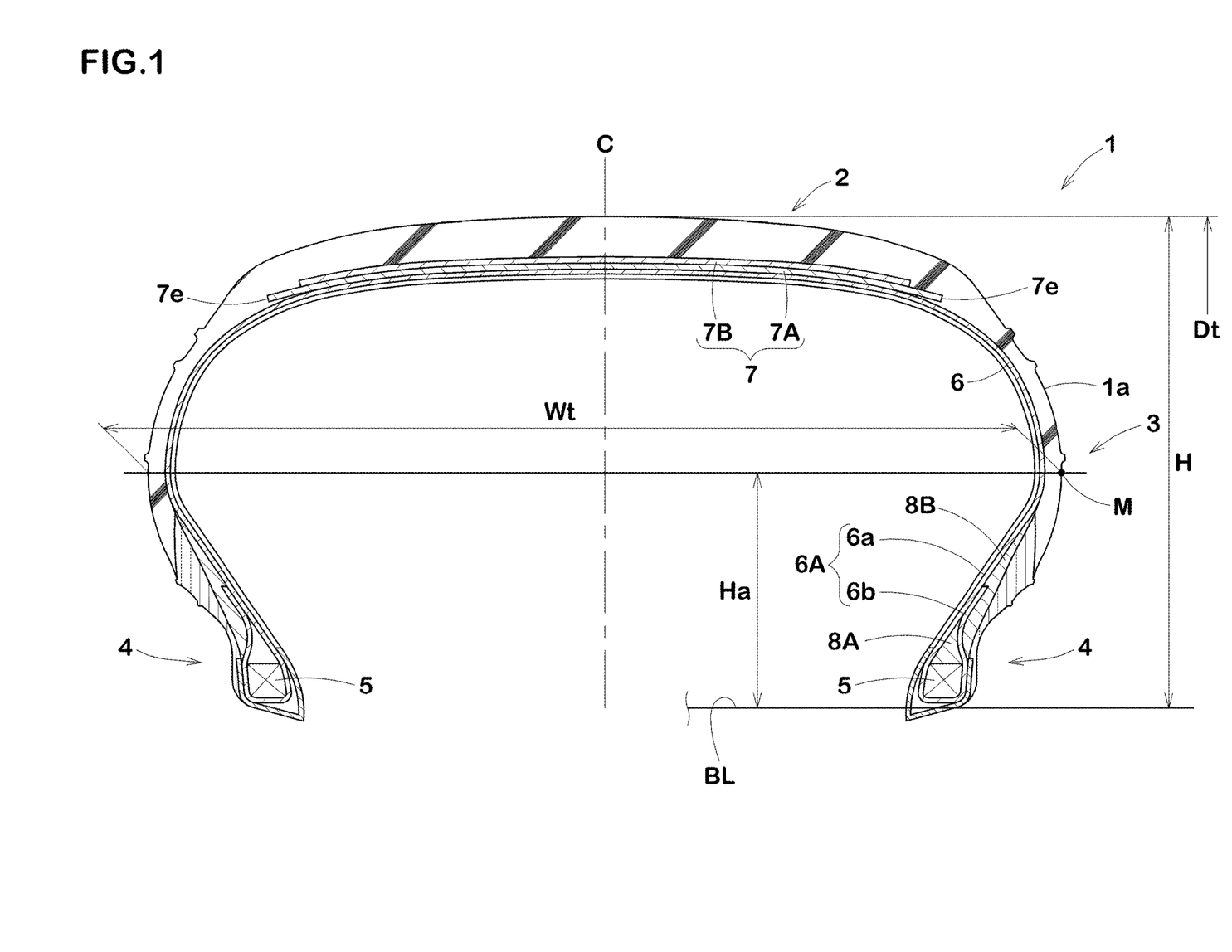
FIG. 1 is a cross-sectional view of a pneumatic tire as an embodiment of the present invention.

FIG. 1 is a tire meridian sectional view including a tire rotational axis, of a pneumatic tire 1 as an embodiment of the present invention.

The pneumatic tire 1 comprises a tread portion 2, a pair of axially spaced bead portions 4 each with a bead core 5 embedded therein, a pair of sidewall portions 3 extending between the tread edges and the bead portions 4, a carcass 6 extending between the bead portions 4, and a tread reinforcing belt 7 disposed radially outside the carcass 6 in the tread portion 2.

In this specification, unless otherwise noted, various dimensions, positions and the like of the tire refer to those under such a condition that the tire is held, without being mounted on a wheel rim, so that the bead width between the bead portions becomes equal to the rim width between rim flanges of a wheel rim determined by the tire size, for example, according to standards organizations, i.e. JATMA, T&RA, ETRTO, TRAA, STRO, ALAPA, ITTAC and the like, or specified by the tire manufacturer.

According to the present invention, the tire 1 satisfies the following conditions (1) and (2), $$Dt = <59.078 \times Wt^{0.498}, \quad (1)$$

$$Dt >= 59.078 \times Wt^{0.460}, \quad (2)$$

wherein

Dt is the outer diameter in mm of the tire measured at the tire equator C, and

Wt is the cross-section width in mm of the tire measured at the maximum tire section width position M.

Here, the maximum tire section width position M is a position on the outer surface $1a$ of the tire 1 at which the section width of the tire becomes maximum when measured by excluding circumferentially discontinuous protrusions such as characters and rim protectors if any.

Figure 2:
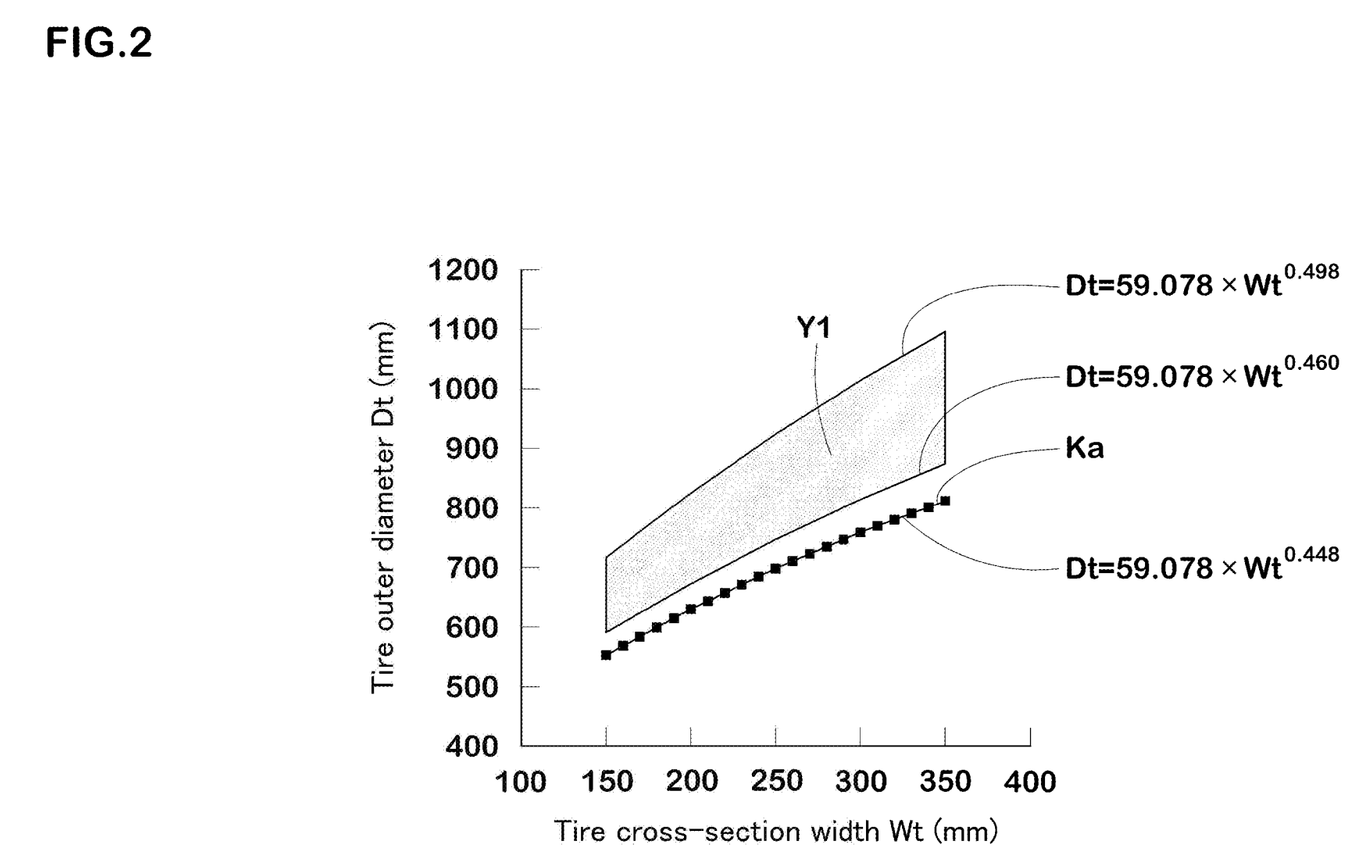
FIG. 2 is a graph in which cross-sectional width values and outer diameter values of conventional pneumatic tires which values are regulated by the Japan Automobile Tire Manufacturers Association, are plotted.

FIG. 2 is a graph obtained by plotting results of an investigation of the relationship between the cross-sectional width Wt and the tire outer diameter Dt represented by JATMA which was carried out on conventional tires.

From the results, the average relationship between the tire cross-sectional width Wt and the tire outer diameter Dt in the conventional tires represented by JATMA can be expressed by the following expression (A) as indicated by an envelope curve Ka in FIG. 2:

$$Dt = 59.078 \times Wt^{0.448}. \quad (A)$$

on the other hand, the region Y1 satisfying the conditions (1) and (2) is positioned on the larger outer diameter Dt side (namely, on the upper side in the graph) of the average relationship Ka expressed by the expression (A). In other word, the region Y1 is not overlapped with the average relationship Ka.

The tire 1 satisfying the conditions (1) and (2) has a narrow tire section width and a large tire outer diameter Dt, and thereby, the rolling resistance and the air resistance are reduced. Thus, the tire 1 has excellent fuel consumption performance.

Figure 3:
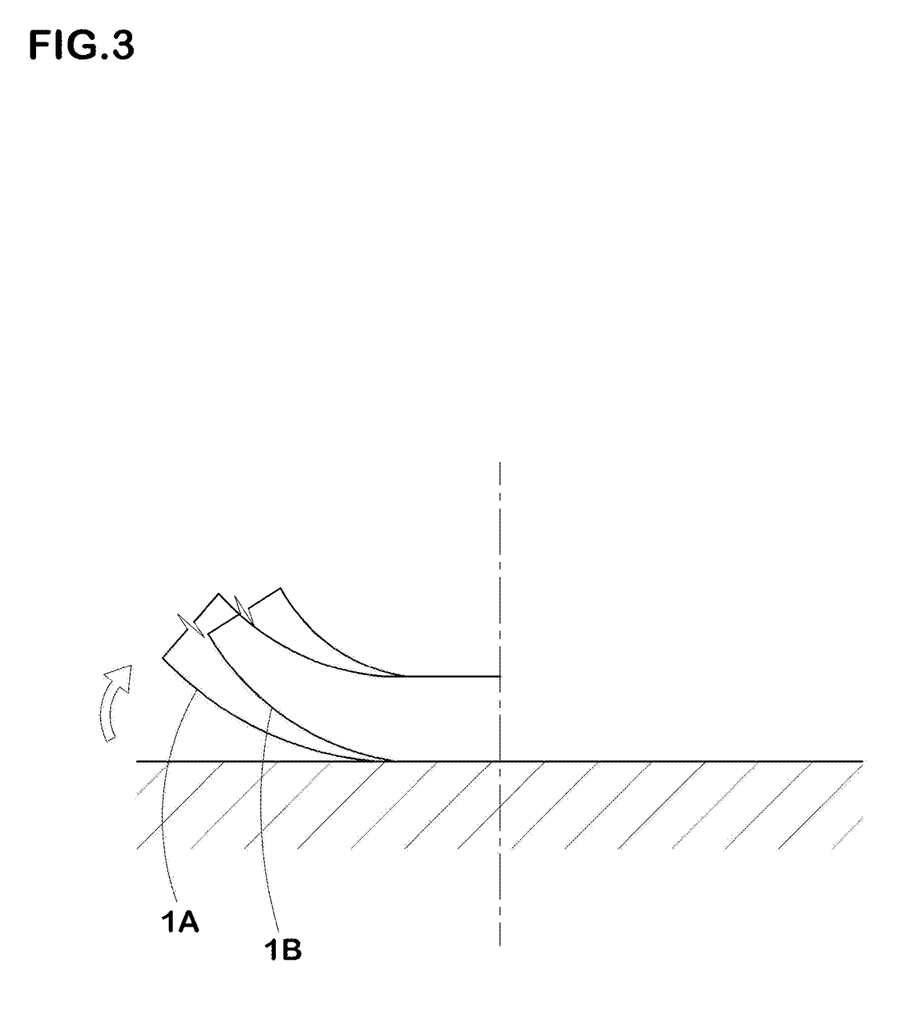
FIG. 3 is a conceptual diagram illustrating the effect of increasing the diameter of a pneumatic tire.

As schematically shown in FIG. 3, in the tire ground contacting patch, a tire 1A having a relatively large outer diameter Dt has less bending deformation in the tire circumferential direction than a tire is having a relatively small outer diameter Dt, therefore, the amount of energy loss is small, which is effective in reducing the rolling resistance. When the condition (2) is not satisfied, it becomes difficult to obtain the reduction of the rolling resistance by the large tire outer diameter.

When the condition (1) is not satisfied, in order to obtain a required load capacity, the tire needs to be inflated to a higher pressure, which adversely affects the ride comfort performance and the noise performance.

The bead core 5 in this embodiment is formed in a rectangular shape having a radially outer surface $5a$ and an axially inner surface $5b$ extending radially inwardly from the axially inner end of the radially outer surface $5a$.

The bead core 5 is not limited to such a rectangular shape. It is possible to adopt various shapes such as a circular shape and a hexagonal shape.

The carcass 6 extends between the bead portions 4 through the tread portion 2 and the sidewall portions 3.

The carcass 6 in this example is composed of a single ply 6A of carcass cords arranged radially at an angle of from 75 to 90 degrees with respect to the tire equator c.

The carcass ply 6A extends between the bead portions 4 through the tread portion 2 and the sidewall portions 3, and is turned up around the bead core 6 in each bead portion 4 from the inside to the outside of the tire so as to form a pair of turnup portions $6b$ and a main portion $6a$ therebetween. The turnup portion $6b$ extends radially outwardly along the axially outer surface of the bead core beyond the radially outer surface $5a$, and then contacts with the main portion $6a$.

The belt 7 is composed of two cross breaker plies 7A and 7B of cords arranged at an angle of from 10 to 35 degrees with respect to the tire equator c for example.

The belt 7 has edges $7e$ on both sides of the tire equator c, and the belt 7 extends continuously from one of the edges $7e$ to the other.

Figure 4:
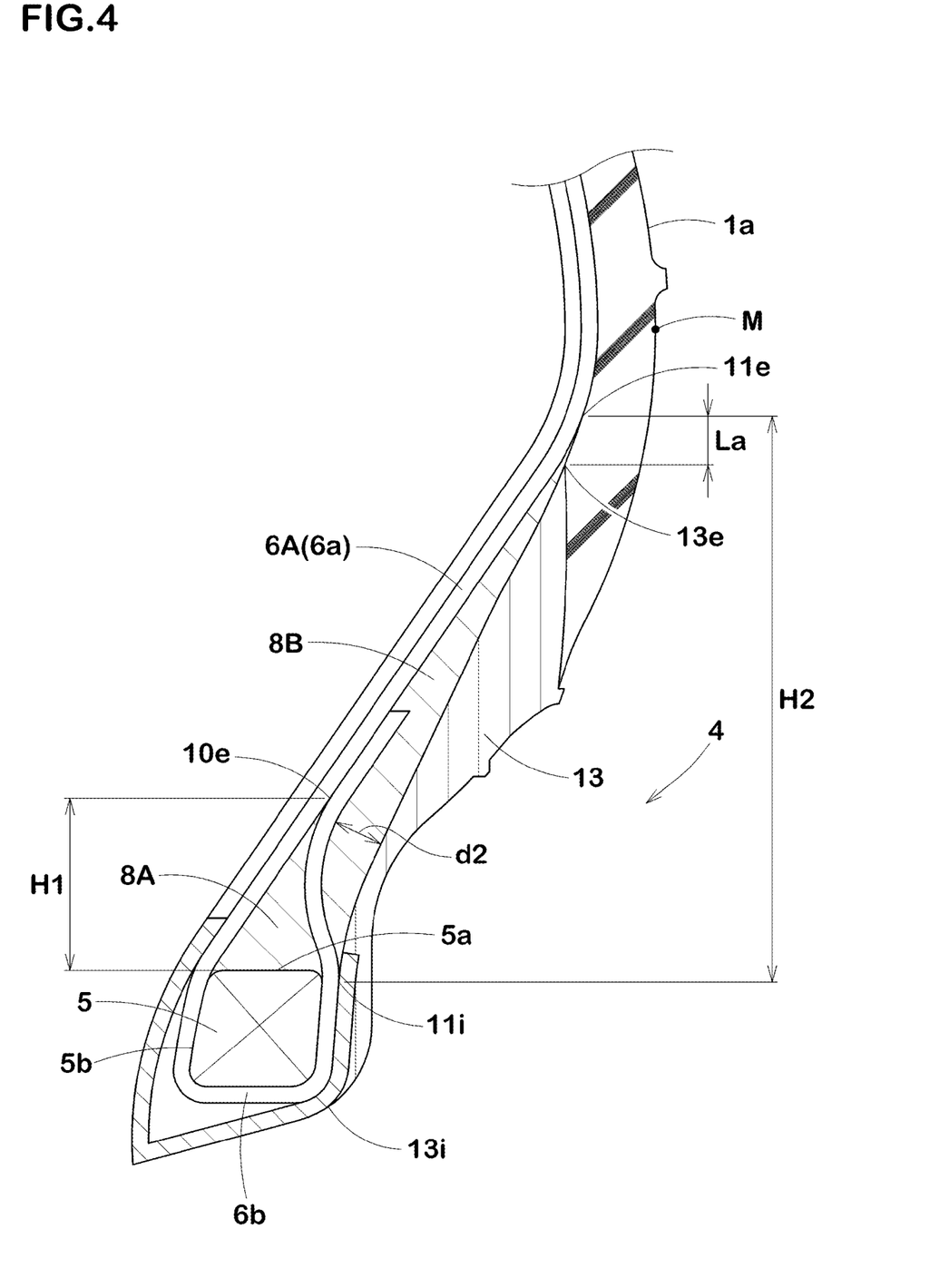
FIGS. 4, 5 and 6 are enlarged cross sectional views of the bead portion shown in FIG. 1 which are the same but differently provided with reference numbers.

Each of the bead portions 4 is provided with a first apex rubber 8A disposed between the main portion $6a$ and the turnup portion $6b$, and a second apex rubber 8B disposed axially outside the turnup portion $6b$.

The first apex rubber 8A and second apex rubber 8B have different complex elastic moduli. The complex elastic modulus E*b of the second apex rubber 8B is higher than the complex elastic modulus E*a of the first apex rubber 8A.

Such second apex rubber 8B contributes to enhancing the in-plane torsional rigidity of the bead portion 4 of the tire 1 having a narrow and large diameter, and improves the steering stability performance.

Further, the first apex rubber 8A contributes to suppressing an increase in the vertical spring constant of the bead portion 4 of the tire 1 having a narrow width and large outer diameter, and thus improves the ride comfort performance and the noise performance.

Here, the complex elastic modulus E* is measured according to Japanese Industrial standard (JIS) K6394, using a viscoelasticity spectrometer in the tensile deformation mode under the following conditions: initial strain of 10%, amplitude of +/−2%, frequency of 10 Hz, and temperature of 70 degrees c.

It is preferable that the complex elastic modulus $E^*b$ of the second apex rubber 8B is set in a range from 60 to 70 MPa. If the complex elastic modulus $E^*b$ of the second apex rubber 8B is less than 60 MPa, then the in-plane torsional rigidity may not be increased.

If the complex elastic modulus $E^*b$ of the second apex rubber 8B is more than 70 MPa, then the vertical spring constant of the bead portion 4 becomes large, which may deteriorate the ride comfort performance and the noise performance.

Preferably, the difference $(E^*b-E^*a)$ between the complex elastic modulus $E^*b$ of the second apex rubber 8B and the complex elastic modulus $E^*a$ of the first apex rubber 8A is set in a range from 15 to 35 MPa.

If the difference $(E^*b-E^*a)$ is less than 15 MPa or more than 35 MPa, then it becomes difficult to improve the steering stability performance enjoying benefit of the increase of the in-plane torsional rigidity of the bead portion 4, and the noise performance and the ride comfort performance enjoying benefit of suppressing the increase of the vertical spring constant, in a well-balanced manner.

The first apex rubber 8A extends radially outwardly from the radially outer surface 5a of the bead core 5.

The first apex rubber 8A is tapered toward the radially outer edge thereof so as to have a triangular cross-sectional shape. The first apex rubber 8A is disposed to improve the steering stability performance by moderately reinforcing the bead portion while suppressing excessive reduction of the vertical spring constant.

The second apex rubber 8B is disposed so as to abut on the axially outer side of the main portion 6a and the axially outer side of the turnup portion 6b.

Such second apex rubber 8B prevents the main portion 6a and the turnup portion 6b from collapsing axially inward, thereby, the improved steering stability performance is maintained.

The radially outer edge 11e of the second apex rubber 8B is located radially inside the maximum tire section width position M.

Such second apex rubber 8B avoids an excessive increase in the in-plane torsional rigidity of the bead portion 4 and maintains the noise performance at high level.

The second apex rubber 8B has a maximum thickness d2 which occurs in a range in the tire radial direction extending toward the radially inside and toward the radially outside from the radially outer edge 10e of the first apex rubber 8A by 10% of the radial dimension H1 of the first apex rubber 8A.

Thereby, the vicinity of the radially outer edge 10e where the reinforcing effect of the first apex rubber 8A becomes minimum, is reinforced, and the above-mentioned axially inward collapsing of the main portion 6a and the turnup portion 6b can be effectively prevented.

It is preferable that the maximum thickness d2 of the second apex rubber 8B is set in a range from 2.0 to 4.0 mm in order to improve the ride comfort performance, the noise performance, and the steering stability performance in a well-balanced manner.

It is preferable that the radially inner edge 11i of the second apex rubber 8B is located in a range in the tire radial direction extending 3 mm toward the radially inside and toward the radially outside from the radially outer surface 5a of the bead core 5.

If the radially inner edge 11i of the second apex rubber 8B is located at a radial position more than 3 mm radially outward from the radially outer surface 5a, the effect of improving the in-plane torsional rigidity may be reduced.

If the radially inner edge 11i of the second apex rubber 8B is located at a radial position more than 3 mm radially inward from the radially outer surface 5a, the in-plane torsional rigidity of the bead portion 4 cannot be increased as expected, despite an increase in the tire weight.

It is preferable that the radial dimension H2 of the second apex rubber 8B is not less than 2.5 times, more preferably not less than 3.0 times, but not more than 4.0 times, more preferably not more than 3.5 times the radial dimension H1 of the first apex rubber 8A.

If the radial dimension H2 of the second apex rubber 8B is less than 2.5 times the radial dimension H1 of the first apex rubber 8A, then the effect of suppressing the increase in the vertical spring constant may be excessively increased.

If the radial dimension H2 of the second apex rubber 8B is more than 4.0 times the radial dimension H1 of the first apex rubber 8A, then the in-plane torsional rigidity of the bead portion 4 may be excessively increased.

Preferably, the radial dimension H2 of the second apex rubber 8B is set in a range from 25 to 40 mm, for example.

The bead portions 4 are each provided with a clinch rubber 13 disposed axially outside the second apex rubber 8B.

Preferably, the clinch rubber 13 has a complex elastic modulus $E^*2$ which is lower than the complex elastic modulus $E^*b$ of the second apex rubber 8B in order to suppress an unnecessary increase in the vertical spring constant of the bead portion 4 and not to deteriorate the noise performance.

Preferably, the difference $(E^*b-E^*2)$ between the complex elastic modulus $E^*2$ of the clinch rubber 13 and the complex elastic modulus $E^*b$ of the second apex rubber 8B is set in a range from 15 to 30 MPa, for example.

In this embodiment, the clinch rubber 13 abuts on the axially outer side of the second apex rubber 8B, and forms a part of the outer surface 1a of the tire 1. The clinch rubber 13 prevents abrasion by a rim flange.

The radially outer edge 13e of the clinch rubber 13 is located radially inside the radially outer edge 11e of the second apex rubber 8B.

Such clinch rubber 13 enhances the in-plane torsional rigidity in a well-balanced manner while suppressing an increase in the vertical spring constant of the bead portion 4.

It is preferable that the radial distance La between the radially outer edge 13e of the clinch rubber 13 and the radially outer edge 11e of the second apex rubber 8B is not less than 20%, but not more than 50% of the radial dimension H1 of the first apex rubber 8A.

The radially inner edge 13i of the clinch rubber 13 is preferably extended to a position radially inside the bead core 5, more preferably extended to the base of the bead portion.

Figure 5:
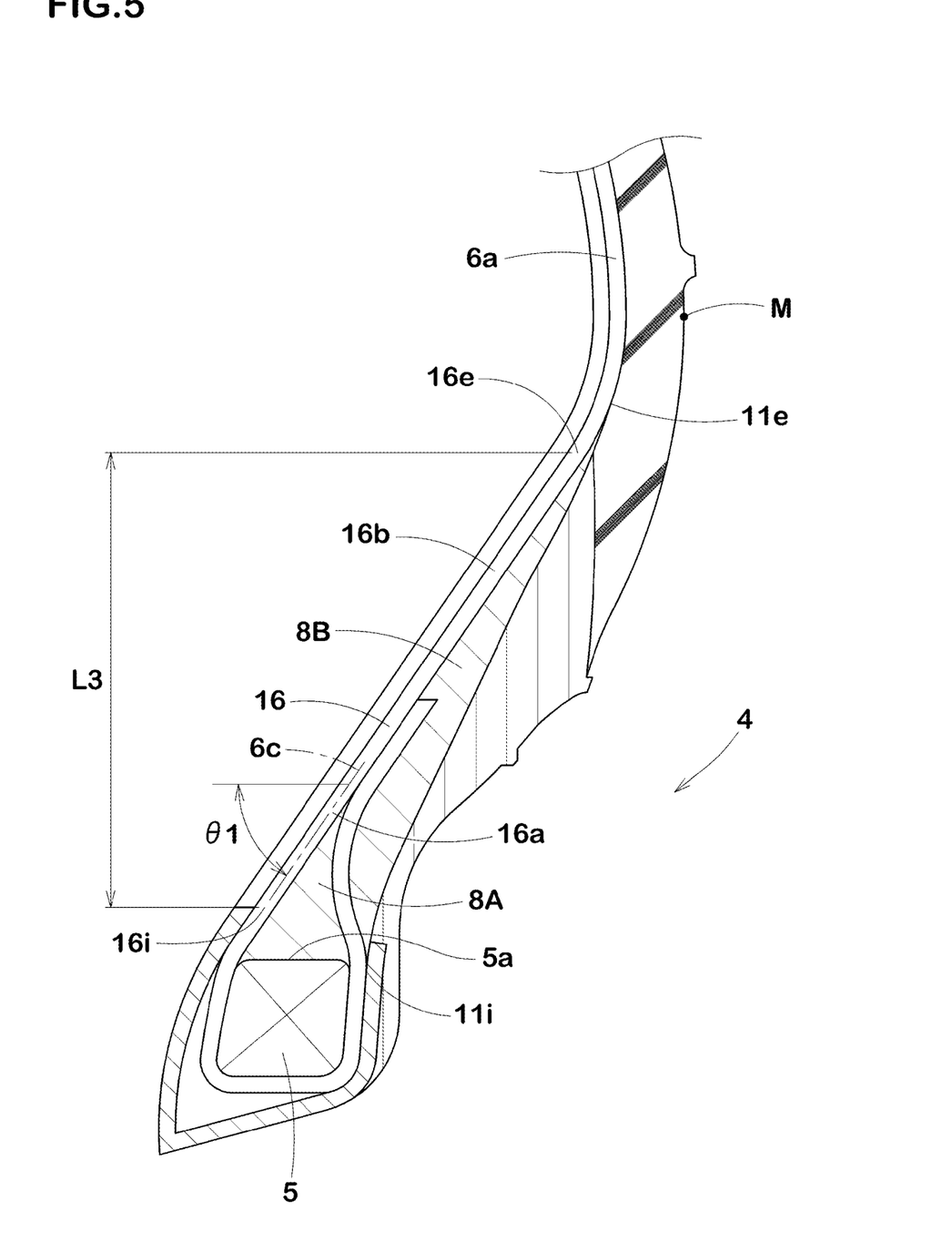

As shown in FIG. 5, in the cross sectional view of the bead portion, the main portion 6a of the carcass 6 includes a first inclined portion 16 which is positioned radially inside the maximum tire section width position M, and is inclined at an angle θ1 in a range from 50 to 60 degrees with respect to the tire axial direction.

The angle θ1 may be substantially constant, namely, the first inclined portion 16 may be substantially straight.

Alternatively, the angle θ1 may be variable within the above range; for example, the first inclined portion 16 may be curved in an arc shape.

Such first inclined portion 16 can effectively improve the steering stability performance during cornering.

In the present embodiment, the first inclined portion 16 is substantially straight. Such first inclined portion 16 can maintain high ride comfort performance. In this specification, the term "substantially straight" is meant to include an arc having a radius of curvature of more than 1000 mm in addition to straight.

The first inclined portion 16 in this example has a first portion 16a abutting to the axially inner side of the first apex rubber 8A, and
a second portion 16b abutting to the axially inner side of the second apex rubber 8B.
Such first inclined portion 16 cooperates with the first apex rubber 8A and the second apex rubber 8B to effectively improve the steering stability performance.

The radial dimension L3 of the first inclined portion 16 is smaller than the radial dimension H2 of the second apex rubber 8B. Further, the radial dimension L3 of the first inclined portion 16 is larger than the radial dimension H1 of the first apex rubber 8A. Such first inclined portion 16 can prevent the ride comfort performance from deteriorating.

In order to effectively derive the above mentioned advantageous effect, the radially outer end 16e of the first inclined portion 16 is preferably located radially inside the radially outer edge 11e of the second apex rubber 8B. The radially inner end 16i of the first inclined portion 16 is preferably located radially outside the radially outer surface 5a of the bead core 5.
Further, the radial dimension L3 of the first inclined portion 16 is preferably set in a range from 70% to 90% of the radial dimension H2 of the second apex rubber 8B.

Figure 6:
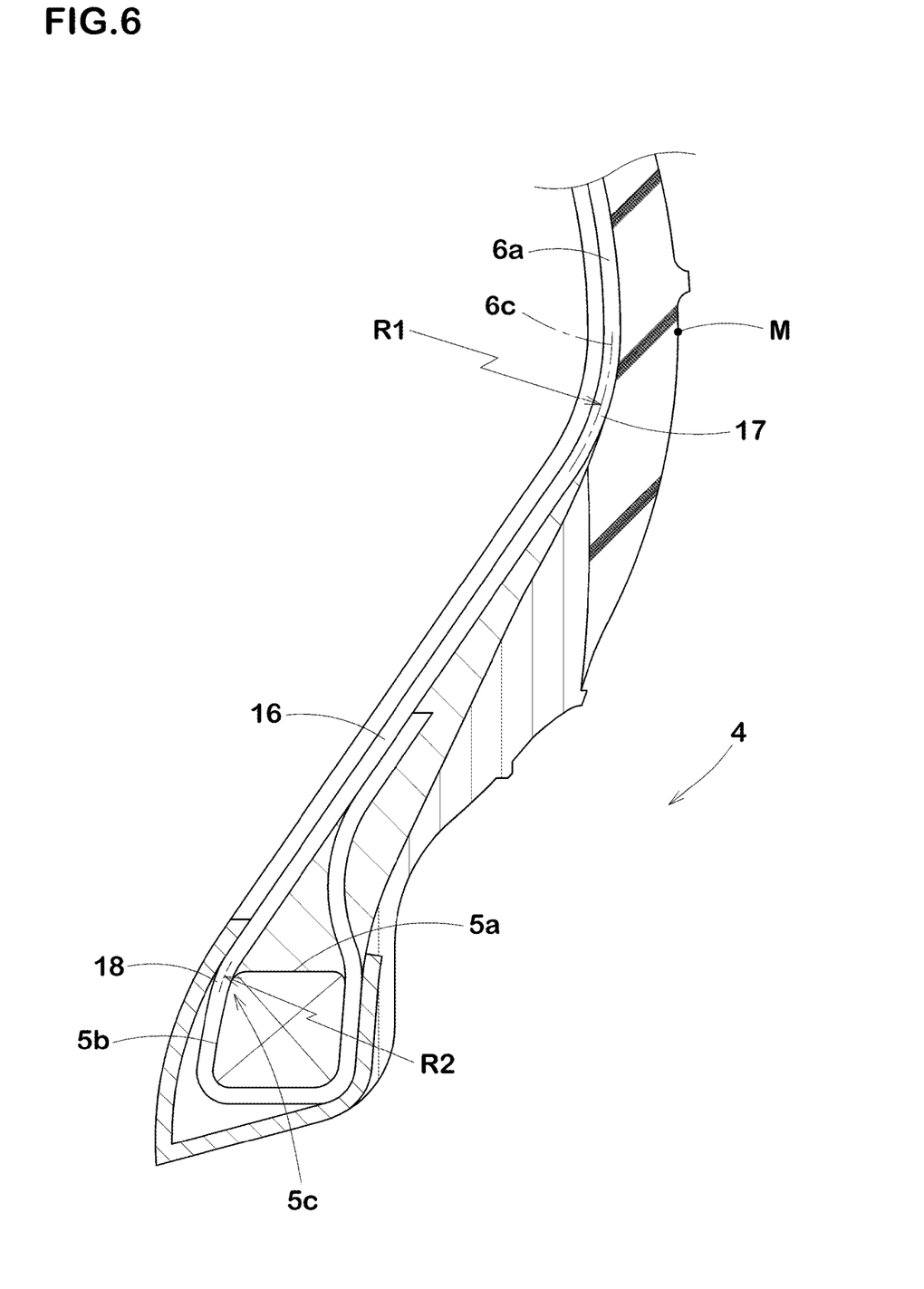

As shown in FIG. 6, in the cross sectional view of the bead portion, the main portion 6a of the carcass ply further includes a first arc-shaped portion 17 and a second arc-shaped portion 18.

The first arc-shaped portion 17 extends radially outward continuously from the first inclined portion 16, and is curved convexly toward the axially outside.
The second arc-shaped portion 18 extends radially inward continuously from the first inclined portion 16, and is curved convexly toward the axially inside.
The first arc-shaped portion 17 and the second arc-shaped portion 18 are each defined as having a single radius of curvature of not more than 25 mm.

In the present embodiment, the first arc-shaped portion 17 is located near the maximum tire section width position M. The first arc-shaped portion 17 in this example extends between the first inclined portion 16 and the maximum tire section width position M.

In the present embodiment, the second arc-shaped portion 18 is provided adjacently to the corner 5c where the radially outer surface 5a and the axially inner surface 5b of the bead core 5 intersect. The second arc-shaped portion 18 extends toward the radially inside and toward the radially outside from the corner 5c.

In the present embodiment, the radius R1 of curvature of the first arc-shaped portion 17 is smaller than the radius R2 of curvature of the second arc-shaped portion 18.
Such first arc-shaped portion 17 serves to reduce the vertical spring constant of the sidewall portion 3 and enhance the ride comfort performance and the noise performance.
Further, the second arc-shaped portion 18 suppresses looseness of the carcass ply 6A and maintains the steering stability performance at high level.

In order to improve the ride comfort performance, noise performance, and steering stability performance of this narrow-with large-diameter pneumatic tire 1 in a well-balanced manner, it is preferred that the radial height Ha of the maximum tire section width position M is set in a range from 40% to 60% of the cross-section height H of the tire 1, each measured from the bead base line BL. Incidentally, the cross-section height H corresponds to ½ of the difference between the tire outer diameter Dt and the rim diameter (not shown).

While detailed description has been made of a preferable embodiment of the present invention, the present invention can be embodied in various forms without being limited to the illustrated embodiment.
Comparison Tests
Based on the structure shown in FIG. 1, pneumatic tires of size 175/60 R18 for passenger cars were experimentally manufactured and tested for the steering stability performance, noise performance, and ride comfort performance as follows.

Specifications of the test tires are listed in Table 1.
<Steering Stability Performance, Noise Performance, and Ride Comfort Performance>
The test tires mounted on wheel rims of size 18×5.0 J and inflated to 260 kPa were attached to a 1800 cc passenger car. During running at 40 to 120 km/hr on a dry asphalt road of a test circuit course, the test driver evaluated the ride comfort performance, and the steering stability performance based on responsiveness, rigidity, gripping force, stability, and transient characteristics.
The results of the steering stability performance and the ride comfort performance are indicated in Table 1 by an index based on comparative example tire Ref.1 being 100, wherein the larger value is better.

Further, the noise performance test was conducted by measuring the sound pressure level of a 100-350 Hz frequency band in the interior of the running vehicle.
The results of the noise performance are indicated in Table 1 by an index based on the sound pressure level (dB) of comparative example tire Ref.1 being 100, wherein the smaller value is better.

TABLE 1

| Tier | Ref. 1 | Ref. 2 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| E * a (MPa) | 65 | 30 | 30 | 30 | 50 | 30 | 55 | 30 | 30 | 30 |
| E * b (MPa) | 65 | 30 | 65 | 45 | 65 | 40 | 65 | 65 | 65 | 65 |
| H2/H1 | 3 | 3 | 3 | 3 | 3 | 3 | 3 | 4 | 3 | 3 |
| d2 (mm) | 3 | 3 | 3 | 3 | 3 | 3 | 3 | 3 | 5 | 3 |
| H2 (mm) | 30 | 30 | 30 | 30 | 30 | 30 | 30 | 30 | 30 | 45 |
| Steering stability | 100 | 80 | 102 | 100 | 102 | 100 | 102 | 102 | 102 | 105 |
| Noise performance | 100 | 90 | 90 | 90 | 92 | 92 | 94 | 90 | 92 | 95 |
| Ride comfort | 100 | 110 | 112 | 112 | 110 | 106 | 106 | 112 | 108 | 106 |

From the test results, it was confirmed that, as compared with the comparative example tires, the example tires according to the present invention was improved in the steering stability performance, the noise performance and the ride comfort performance in a well balanced manner.

DESCRIPTION OF THE REFERENCE SIGNS 1 pneumatic tire
4 bead portion
5 bead core
6 carcass
6A carcass ply
6a main portion
6b turnup portion
8A first apex rubber
8B second apex rubber

The invention claimed is:
1. A pneumatic tire comprising:
a tread portion,
a pair of sidewall portions,
a pair of bead portions each with a bead core embedded therein,
a carcass extending between the bead portions through the tread portion and the sidewall portions and consisting of a carcass ply extending between the bead portions through the tread portion and the sidewall portions, and turned up around the bead core from an inside to an outside of the tire in each of the bead portions, so as to form a pair of turnup portions and a main portion therebetween, and
a clinch rubber, a first apex rubber, and a second apex rubber which are disposed in each of the bead portions,
wherein
the first apex rubber is disposed between the turnup portion and the main portion,
the second apex rubber is disposed to abut on an axially outer side of the turnup portion and an axially outer side of the main portion, and has a maximum thickness at a radial position,
a complex elastic modulus E*b of the second apex rubber is larger than a complex elastic modulus E*a of the first apex rubber,
the clinch rubber is disposed to abut on an axially outer side of the second apex rubber, and has a thickness gradually decreased radially outward and gradually decreased radially inward to a vicinity of the radial position of the maximum thickness of the second apex rubber,
wherein
in a cross sectional view of each of the bead portions, the main portion of the carcass ply comprises:
a first inclined portion extending substantially straight,
a first arc-shaped portion extending radially outwardly from the first inclined portion and curved convexly toward an axially outside, and
a second arc-shaped portion extending radially inwardly from the first inclined portion and curved convexly toward an axially inside,
the first arc-shaped portion is positioned between the first inclined portion and a maximum tire section width position of the tire in the tire radial direction,
the second arc-shaped portion is positioned adjacently to a corner of the bead core and extends radially inwardly and outwardly therefrom,
said first inclined portion includes:
a first portion abutting on an axially inner side of the first apex rubber,
a second portion abutting on an axially inner side of the second apex rubber, and
a portion therebetween abutting on an axially inner side of the turnup portion of the carcass ply,
the first inclined portion has a radially outer end located radially inside a radially outer edge of the second apex rubber, and
wherein
a cross-sectional width Wt in mm of the tire and an outer diameter Dt in mm of the tire satisfy the following conditions (1) and (2),

$$Dt = <59.078 \times Wt^{0.498} \quad (1)$$

$$Dt >= 59.078 \times Wt^{0.460} \quad (2).$$

2. The pneumatic tire according to claim 1, wherein the second apex rubber has a radially inner edge located within a range extending in the tire radial direction by a radial distance of 3 mm toward a radially outside from an outer surface of the bead core, and extending in the tire radial direction by a radial distance of 3 mm toward a radially inside from the outer surface of the bead core.

3. The pneumatic tire according to claim 1, wherein a difference (E*b−E*a) between the complex elastic modulus E*b of the second apex rubber and the complex elastic modulus E*a of the first apex rubber is in a range from 15 to 35 MPa.

4. The pneumatic tire according to claim 3, wherein the complex elastic modulus E*b of the second apex rubber is in a range from 60 to 70 MPa.

5. The pneumatic tire according to claim 1, wherein the radially outer edge of the second apex rubber is located radially inside the maximum tire section width position.

6. The pneumatic tire according to claim 5, wherein the radial position at which said maximum thickness of the second apex rubber occurs is within a range extending in the tire radial direction by a radial distance of 10% of a radial dimension of the first apex rubber, toward a radially outside and toward a radially inside from a radially outer edge of the first apex rubber.

7. The pneumatic tire according to claim 5, wherein the clinch rubber has a radially outer edge located radially inside the radially outer edge of the second apex rubber.

8. The pneumatic tire according to claim 7, wherein the clinch rubber has a complex elastic modulus E*2 which is lower than the complex elastic modulus E*b of the second apex rubber, and
a difference (E*b−E*2) between the complex elastic modulus E*2 of the clinch rubber and the complex elastic modulus E*b of the second apex rubber is in a range from 15 to 30 MPa.

9. The pneumatic tire according to claim 7, wherein the clinch rubber forms a part of an outer surface of the tire.

10. The pneumatic tire according to claim 7, wherein a radial distance between a radially outer edge of the clinch rubber and the radially outer edge of the second apex rubber is not less than 20% but not more than 50% of a radial dimension of the first apex rubber.

11. The pneumatic tire according to claim 1, wherein a radial dimension of the second apex rubber is larger than a radial dimension of the first apex rubber.

12. The pneumatic tire according to claim 11, wherein the radial dimension of the second apex rubber is in a range from 2.5 to 4.0 times the radial dimension of the first apex rubber.

13. The pneumatic tire according to claim 12, wherein the radial dimension of the second apex rubber is in a range from 25 to 40 mm.

14. The pneumatic tire according to claim 1, wherein in the cross sectional view of the bead portion, said first inclined portion is inclined at an angle in a range from 50 to 60 degrees with respect to the tire axial direction.

15. The pneumatic tire according to claim 14, wherein a radial dimension of the first inclined portion is smaller than a radial dimension of the second apex rubber, and larger than a radial dimension of the first apex rubber.

16. The pneumatic tire according to claim 15, wherein the first inclined portion has a radially inner end located radially outside a radially outer surface of the bead core, and
the radial dimension of the first inclined portion is in a range from 70% to 90% of the radial dimension of the second apex rubber.

17. A pneumatic tire having a cross-sectional width Wt in mm and an outer diameter Dt in mm which satisfy the following conditions (1) and (2), $$Dt =< 59.078 \times Wt^{0.498} \quad (1)$$

$$Dt >= 59.078 \times Wt^{0.460}, \quad (2)$$

comprising:
- a tread portion,
- a pair of sidewall portions,
- a pair of bead portions each with a bead core embedded therein,
- a carcass consisting of a carcass ply extending between the bead portions through the tread portion and the sidewall portions, and turned up around the bead core from an inside to an outside of the tire in each of the bead portions, so as to form a pair of turnup portions and a main portion therebetween, and
- a first apex rubber, a second apex rubber, and a clinch rubber which are disposed in each of the bead portions, wherein
  - a complex elastic modulus E*b of the second apex rubber is larger than a complex elastic modulus E*a of the first apex rubber,
  - the first apex rubber is disposed between the turnup portion and the main portion,
  - the second apex rubber is disposed to abut on an axially outer side of the turnup portion and an axially outer side of the main portion, and has a maximum thickness at a radial position,
  - the clinch rubber is disposed axially outside the second apex rubber, and has a radially outer edge located radially inside a radially outer edge of the second apex rubber, so that a radial distance between a radially outer edge of the clinch rubber and the radially outer edge of the second apex rubber is not less than 20% but not more than 50% of a radial dimension of the first apex rubber, and
  - the clinch rubber has a thickness gradually decreased radially outward and gradually decreased radially inward to a vicinity of the radial position of the maximum thickness of the second apex rubber.

18. The pneumatic tire according to claim 17, wherein the clinch rubber abuts on an axially outer side of the second apex rubber, and forms a part of an outer surface of the tire,
the clinch rubber has a complex elastic modulus E*2 which is lower than the complex elastic modulus E*b of the second apex rubber, and
a difference (E*b−E*2) between the complex elastic modulus E*2 of the clinch rubber and the complex elastic modulus E*b of the second apex rubber is in a range from 15 to 30 MPa.

\* \* \* \* \*